July 30, 1968  F. K. VAN ALEN  3,394,659

MOTOR PUMP

Filed June 3, 1966

United States Patent Office 3,394,659
Patented July 30, 1968

3,394,659
MOTOR PUMP
Fred K. van Alen, North Huntingdon Township, Irwin, Pa., assignor to Westinghouse Electric Corporation, Pittsburgh, Pa., a corporation of Pennsylvania
Filed June 3, 1966, Ser. No. 555,161
8 Claims. (Cl. 103—87)

ABSTRACT OF THE DISCLOSURE

A thermal barrier for a motor pump having a pump housing and a thermal barrier separating the housing into a motor chamber and a pump chamber, and a layer of closely spaced tubing mounted on the side of the thermal barrier facing the pump chamber.

---

This invention relates to a motor pump having a thermal barrier and more particularly it pertains to a thrust support plate functioning as a thermal barrier for thermally insulating the motor chamber from the pump chamber.

Some types of motor pumps are of unitary construction in order to substantially reduce leakage. Where the pump is operated at relatively high temperature and pressure conditions, there is a problem of permanently damaging the motor unless means are provided to minimize the distortions resulting from high temperature fluids acting on a thrust support plate functioning as a barrier or shield separating the pump from the motor.

The problem of high pressure can be substantially satisfied by providing a wall of sufficient thickness to withstand any pressure at which the pump is operated. However, where high temperature is involved, relatively high thermal stresses are developed in the wall due to a large temperature gradient therethrough. Such high thermal stresses sometimes result in permanent deformation of the wall.

In the past, thermal barrier designs have often consisted of two plates joined by welding so as to provide a gas cavity between them. In order to sustain the pressure acting on the plates in the region of the cavity, the plate walls must be thick. But the high thermal stresses developed due to the temperature differences between the two plates have frequently caused the plates to warp and result in permanent damage and often in the rupture of the welds between the plates.

It has been found that the foregoing problems may be overcome by providing rows of hollow tubing as a substitute for one of the plates and the gas cavity. Tubing applied in closely spaced array to function as a thermal barrier may be provided on one or both sides of a thrust support plate. The tubing is surrounded by the liquid being pumped. The inside of the tubing is either evacuated or it may be gas filled. The tubing may be composed of one continuous tube spirally wound or of many tubes concentrically disposed and extending over all or a greater portion of the surface of the thrust plate. The tubing has a wall thick enough to sustain the external pressure as well as to avoid buckling collapse. However, the tubing wall thickness is not great enough to add substantially to the conduction heat transfer. The circulation of the liquid surrounding the tubing is small so that convective transfer of heat is maintained at a minimum.

Accordingly, it is a general object of this invention to provide a thrust support plate forming a thermal barrier construction which prevents the flow of heat therethrough.

It is another object of this invention to provide a new and improved thermal barrier composed of a plurality of turns of metal tubing which is resistant to the external pressure and which is filled with a fluid having a relatively low coefficient of thermal conductivity.

Another object is to provide a motor pump unit utilizing the new and improved thermal barrier of this invention.

Other objects and advantages of the invention will become apparent hereinafter.

Briefly, the motor pump thermal barrier of the present invention includes a layer of concentric tubes mounted on a thrust support plate that separates the high temperature pump chamber from the low temperature motor chamber. The tubes are preferably concentrically disposed on the pump side of the plate, filled with a heat flow impeding medium, and have their interiors sealed from the interior of the pump chamber. The tubes impede the flow of heat through the support plate and into the motor chamber.

For a better understanding of the nature and objects of the invention, reference is made to the following detailed description and drawings, in which.

Figure 1:
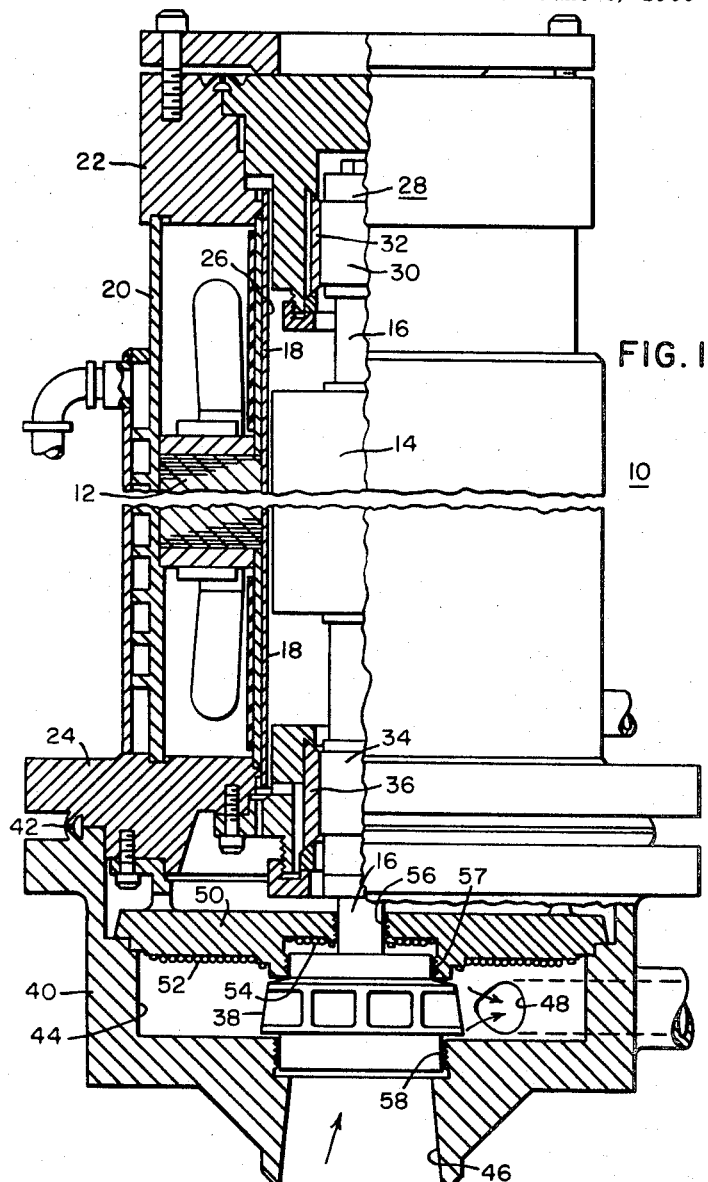
FIGURE 1 is a vertical sectional view showing a portion of a motor pump unit in elevation.

In FIG. 1 a motor pump is generally indicated at 10. It includes a stator 12, a rotor 14, a rotor driven shaft 16, a thin tubular sleeve or can 18, which hermetically separates the rotor chamber 26 from the surrounding stator chamber and an outer housing 20. The upper end of the chamber is closed by a closure member 22 and the lower end is closed by a closure member 24. The stator 12 is an annular member enclosed between the tubular sleeve 18 and the outer housing 20.

The rotor 14 is mounted on the shaft 16 and is contained within a rotor chamber 26 formed within the annular cylindrical sleeve 18.

The shaft 16 is rotatably mounted within journal means generally indicated at 28 which includes a bearing 30 within a sleeve bearing 32. Likewise, the lower portion of the shaft 16 is provided with a bearing 34 which is mounted within a sleeve bearing 36.

As shown in FIG. 1 the lower end portion of the shaft 16 extends through the assembly of the bearings 34 and 36 and has a pump impeller 38 mounted thereon.

A pump casing 40 is attached to the underside of the closure member 24 in a liquid-tight manner such as by an annular weld 42. The casing 40 is a substantially cylindrical member having an inner wall forming a pump chamber 44 in which the pump impeller 38 is mounted.

In addition the casing 40 includes an inlet 46 and an outlet 48 by which the fluid to be pumped is moved through the pump chamber 44.

The upper side of the chamber 44 is isolated from the motor section of the unit 10 by thermal barrier means which includes a thermal barrier and thrust support plate 50 as well as tube means including tubes 52 and 54. The plate 50 has a central aperture which is provided with suitable annular labyrinth seals 56, 57 and 58 which closely receives the shaft 16 and the upper and lower portions of the impeller 38 therein respectively. The seals 56 and 57 limit fluid flow from pump chamber 44 to rotor chamber 26 once pressure equalization therebetween has been achieved.

Figure 2:
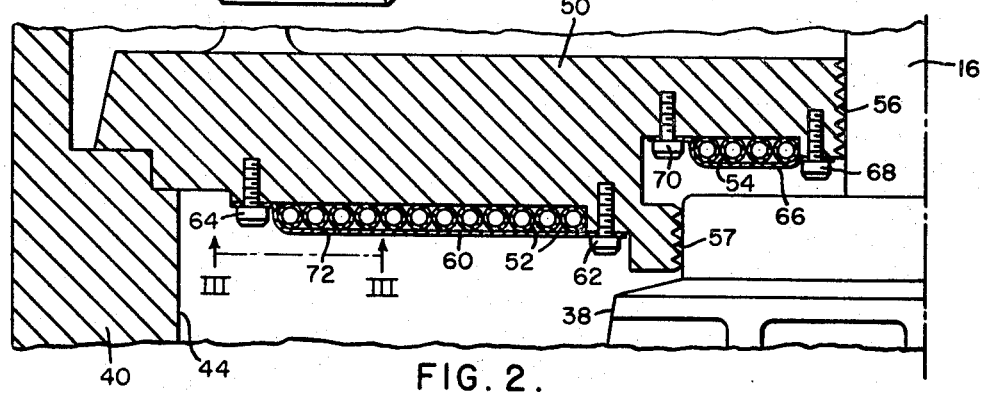
FIG. 2 is an enlarged fragmentary view of a thermal barrier plate constructed in accordance with the principles of this invention and positioned between the pump and motor chambers of a motor pump unit.

As shown in FIG. 2 the plate 50 normally is a member of substantial thickness to support the axial thrust means (not shown) for the motor pump unit 10. In certain applications, the temperature of the liquid being pumped is substantially high. Since flow from the pump chamber to the rotor cavity 26 is minimized by the seals 56 and 57, the temperature of the fluid in the rotor cavity 26 is normally lower than that of the high temperature liquid being pumped. Thus it is necessary to provide thermal barrier means between the pump chamber and the rotor cavity to prevent the passage of an excessive amount of heat from the pump chamber to the motor cavity 26. For operational reasons such as the temperature limits of the electrical insulation of the stator windings, the motor portion of the unit must be retained at a relatively low temperature even though the liquid being pumped has an excessively high temperature.

As shown in FIG. 2, the plate 50 forms a thermal barrier and is provided with a row of tubes 52 which cover the greater part of the undersurface of the plate and which are held snugly in place against the undersurface by a relatively thin keeper plate 60. The plate 60 is an annular member the inner edge portion of which is secured to the plate by a series of spaced bolts 62. The outer peripheral portion of the plate 60 is secured by spaced bolts 64. In a similar manner, any other surface of the plate 50 may be covered with tubes such as the tubes 54 which are similarly retained in place by a keeper plate 66 and by an inner row of spaced bolts 68 and an outer row of bolts 70.

The tubes 52 and 54 which serve as a thermal barrier desirably have a relatively thin wall to minimize heat transfer by conduction. However, the tube walls are thick enough to sustain external presure as well as to avoid collapse by buckling. The tubes 52 and 54 may be composed of an assembly of a plurality of concentrically disposed tubes or hoops having sealed ends. In the alternative the tubes may be composed of one continuous tubing spirally wound. Whether the tubes are concentric or spiral, they are disposed in a planar zone fitting snugly preferably against the undersurface of the plate 50 and in continuous contact with adjacent tube portions.

The keeper plate 60 is an annular member surrounding the upper portion of the impeller 36 and has the primary purpose of holding the tubes 52 in place against the surface of the plate 50 and in continuous contact with each other. Thus, the tubes 52 support each other and mutually prevent buckling and/or expanding against adjacent tube portions. The keeper plate 66 may be replaced by spaced straps extending radially between pairs of spaced bolts 62 and 64.

Figure 3:
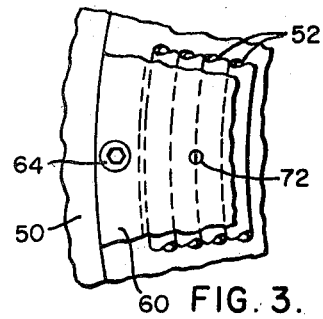
FIG. 3 is an enlarged fragmentary view taken on the line III—III of FIG. 2.

As shown in FIGS. 2 and 3, the keeper plate 60 may be provided with a hole 72 through which the liquid being pumped may pass into the zone between the plate 60 and the undersurface of the plate 50 and into the interstices between the several tubes 52. The plate 66 may be similarly provided with a hole. The liquid being pumped enters the area through the hole 72 and surrounds the tubes at a restricted flow rate. Inasmuch as the hole 72 is small and there are only a few in the entire plate 60 the amount of heat transferred by the liquid entering the hole is very small compared to the insulation factor of the tubes 52.

In this manner, the liquid being pumped exerts pressure upon and around the entire surface of the tubes 52 and 54 and thereby avoids the application of a pressure upon only one side thereof.

The thermal barrier effect of the tubes 52 and 54 is insured by filling the tubes with a gas or other fluid having a low coefficient of thermal conduction or by sealing the ends of the tubes to create a void therein.

Figure 4:
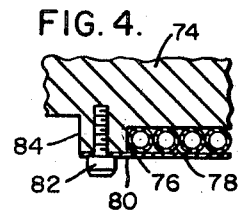
FIG. 4 is a fragmentary vertical sectional view showing another embodiment of the invention.

Another embodiment of the thermal barrier construction is shown in FIG. 4 in which a plate 74 is provided with a recess 76 in the undersurface in which adjacent tube portions 78 are disposed. A relatively thin retainer or keeper plate 80 is secured by spaced bolts 82 to a rim or flange 84 which is an integral part of the plate 72. As shown in FIG. 4 the tubes 78 fit snugly within the recess 76 between the plates 74 and 80 and adjacent to the inner wall of the rim 84.

Figure 5:
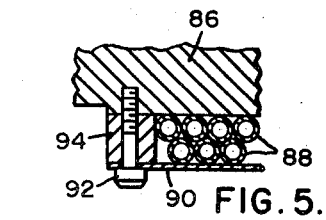
FIG. 5 is an enlarged fragmentary vertical sectional view showing another embodiment of the invention.

Another embodiment of the invention is shown in FIG. 5 in which a thermal plate 86 has two rows of tubes 88 disposed snugly in nested relation with respect to each other where they are retained by a thin retainer or keeper plate 90 similar to the plate 80. The outer periphery of the plate 90 is secured by spaced bolts 92 which bolts pass through a mounting rim 94, the inner side of which is secured against the undersurface of the plate 86 by the bolts 92.

Figure 6:
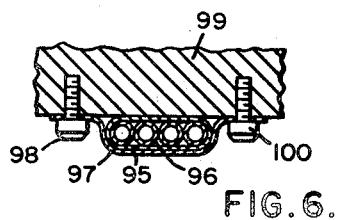
FIG. 6 is an enlarged fragmentary vertical sectional view showing another embodiment of the invention.

Another embodiment of the invention is shown in FIG. 6 in which an enclosing shell 95 seals the tubing 96 from contact with the pumped liquid. The shell 95 is hermetically sealed by welding. The heat transferred through the interstices between tubes 96 is reduced to that of a gas or other fluid having a low coefficient of thermal conduction. The shell 95 is retained by keeper straps or plate 97. The shell 95 is of sufficient thickness to withstand the external pressure when supported internally by the tubing 96. The keeper straps 97 are fastened on the outer periphery to the support plate 99 by outer bolts 98 and on the inner periphery by bolts 100.

It is understood that although the several tubes 52, 54, 78 and 88 are disclosed as being mounted on the undersurface of the several thermal plates 50, 74 and 86, they may be mounted on the upper surface thereof. Moreover, the several tubes 52, 54, 78 and 88 may be disposed in other patterns than the spiral or concentric dispositions described. For example, the tubes may be composed of shorter straight segments in bundles which extend radially of the plate 50, 74 or 86.

It is understood that the above specification and drawings are merely exemplary and not in limitation of the invention.

What is claimed is:

1. In a unitary motor and pump to pump fluids at elevated temperatures, the motor having a shaft for driving the pump, a pump housing attached to the motor and forming a pump chamber, an annular thermal barrier disposed between the pump chamber and the motor to restrict the flow of fluid to the motor, and the motor shaft passing through the center of the thermal barrier, the improvement comprising a layer of closely spaced tubing mounted on the side of the thermal barrier facing and in the pump chamber, the tubing being sealed with respect to the fluid in the chamber and providing a thermal barrier to heat flow from the hot fluid being pumped, and means for securing the tubing to the side of the thermal barrier, whereby the harmful effects of hot fluids in the pump chamber on the thermal barrier are avoided.

2. The thermal barrier of claim 1 in which the tube means includes tubes disposed in at least one planar zone extending across the thermal barrier.

3. The thermal barrier of claim 2 in which the zone of the tubes extends radially outwardly from the shaft.

4. The thermal barrier of claim 1 in which the tubes are concentrically disposed with respect to each other.

5. The thermal barrier of claim 1 in which the tubes are spirally disposed with respect to each other.

6. The thermal barrier of claim 1 in which the thermal plate is provided with recess means for retaining the tubes snugly in place against the surface of the plate.

7. The thermal barrier of claim 6 in which the tubes are retained in place by a sheet-like plate extending across the recess means.

8. The thermal barrier of claim 1 in which the tube interior is filled with a heat flow impeding medium.

References Cited

UNITED STATES PATENTS

| | | |
|---|---|---|
| 2,885,963 | 5/1959 | Ivanoff. |
| 2,997,959 | 8/1961 | Allen. |
| 3,064,148 | 11/1962 | Krouse et al. |

ROBERT M. WALKER, *Primary Examiner.*